United States Patent [19]
Lutz

[11] 3,934,888
[45] Jan. 27, 1976

[54] BI-DIRECTIONAL ROTARY SHAFT SEAL

[75] Inventor: Walter A. Lutz, Lexington, Ky.

[73] Assignee: Parker-Hannifin Corporation, Cleveland, Ohio

[22] Filed: Mar. 13, 1974

[21] Appl. No.: 450,553

Related U.S. Application Data

[63] Continuation of Ser. No. 863,587, Oct. 3, 1969, abandoned.

[52] U.S. Cl. ............................................... 277/134
[51] Int. Cl. .............................................. F16j 15/32
[58] Field of Search ...................................... 277/134

[56] References Cited
UNITED STATES PATENTS

| | | | |
|---|---|---|---|
| 3,497,225 | 2/1970 | Workman | 277/134 |
| 3,501,155 | 3/1970 | Dega et al. | 277/134 X |

FOREIGN PATENTS OR APPLICATIONS

| | | | |
|---|---|---|---|
| 225,796 | 3/1969 | Sweden | 277/134 |

OTHER PUBLICATIONS

Research Publication GMR–532 "Application Of Hydrodynamic Principles in Sealing"– L. Weinard (p. 51) Sept. 30, 1965.

*Primary Examiner*—Samuel B. Rothberg
*Attorney, Agent, or Firm*—Donnelly, Maky, Renner & Otto

[57] ABSTRACT

An oil seal having an annular sealing surface and having, on one tapered side of the sealing surface, circumferential series of oppositely inclined V-shaped ribs which converge toward the sealing surface, the ribs being truncated adjacent the sealing surface to a diameter which is equal to or only slightly greater than the diameter of the sealing surface. The edges of the truncated portions of the ribs, when in contact around a rotating shaft, define with the shaft and with the sealing surface, a series of oppositely disposed wedge shaped spaces which pump oil leaking past the sealing surface back toward the oil side of the sealing surface regardless of the direction of rotation of the shaft.

7 Claims, 4 Drawing Figures

BI-DIRECTIONAL ROTARY SHAFT SEAL

This is a continuation of application Ser. No. 863,587, filed Oct. 3, 1969, now abandoned.

BACKGROUND OF THE INVENTION

In known bi-directional rotary shaft seals the pumping elements whether they be raised ribs, raised triangles, or recessed triangles, lie wholly on the downstream tapered side of the sealing surface whereby to provide wedge shaped spaces for pumping, the tapered side must be deformed to cylindrical form and further expanded to take care of wear. Thus, the contact pressure between the seal and the shaft must be quite high with resulting rapid wear. Moreover, the tooling for molding known seals is quite complex and expensive.

SUMMARY OF THE INVENTION

Contrary to the foregoing, in the bi-directional rotary shaft seal herein the raised ribs constituting the pumping elements are truncated to cylindrical form on a diameter which is substantially equal to or only slightly greater than the diameter of the sealing surface whereby, when the seal is assembled on a shaft, expansion thereof need be only sufficient to accommodate wear without requiring expansion for creating the pumping spaces. The foregoing constitute a principal object of the present invention and other objects and advantages of the present invention will appear hereinafter.

DETAILED DESCRIPTION OF THE INVENTION

Figure 1:
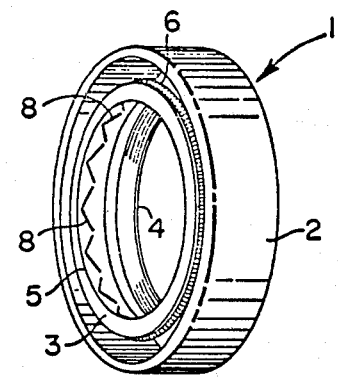
FIG. 1 is a perspective view of a shaft seal embodying the present invention.
Figure 2:
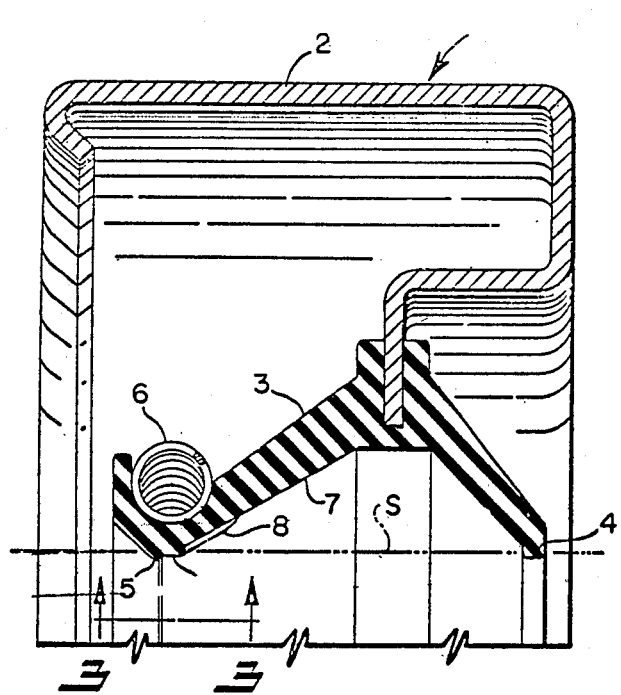
FIG. 2 is a much enlarged radial cross-section view of the FIG. 1 seal.

The shaft seal 1 herein comprises a case 2 having bonded thereto a sealing element 3 of rubber-like material providing an auxiliary sealing surface 4 which is adapted to have light pressure contact with a shaft S to exclude dirt or foreign matter and a main sealing surface 5 which is spring-loaded as by means of the garter spring 6 to make fluid sealing contact with the shaft S.

The downstream tapered side 7 of the annular sealing surface 5 is provided with a circumferential series of V-shaped ribs 8 which are arranged in pairs which converge toward the sealing surface 5. Where the V-shaped ribs 8 merge they are truncated as at 9 on a diameter which is equal to or only slightly greater than the diameter of the sealing surface 5. As an example, the truncated portions 9 of the ribs 8 may be on a diameter which is from 0.000 to 0.008 inch greater than the diameter of the sealing surface 5.

Figure 3:
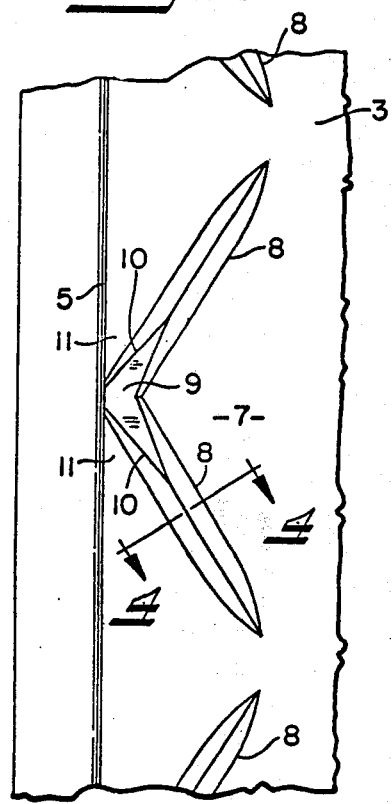
FIG. 3 is a fragmentary plan view on a yet larger scale as viewed along the line 3—3, FIG. 2.

As evident from FIG. 3, the edges 10 of the truncated portions 9 of the ribs 8 define with the sealing surface 5 wedge-shaped spaces 11 which converge both in an axial direction and in a circumferential direction. The spaces 11 are oppositely disposed so that regardless of the direction of rotation of the shaft S around which the seal is assembled, one or the other set of spaces or chambers 11 constitute pumping chambers to pump fluid which leaks past the sealing surface back toward the upstream or oil side of the sealing surface 5.

The ribs 8 herein preferably gradually fade out as shown, and are disconnected or spaced from adjacent ribs 8.

In view of the formation of the pumping elements in the manner indicated, lighter contact pressures are entailed and therefore the life of the seal is greatly enhanced.

Figure 4:
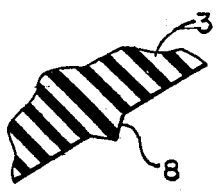
FIG. 4 is a cross-section view taken substantially along the line 4—4, FIG. 3.

As previously mentioned, the tooling for molding the sealing element 3 is greatly simplified in that the die part which forms the sealing surface 5 and the pumping elements may be of conical form with the grooves which form the ribs 8 made therein as by a coining operation without disturbing the bottom of the annular groove which defines the sealing surface 5. The punch for coining the rib forming grooves may be of the form shown in FIG. 4 and as evident, the truncations 9 may be readily accurately machined or ground whereby, when the punch is urged against the outer conical face of the die, the grooves will be of V-shaped form as shown and will have a cylindrical bottom surface constituting the truncations 9. The spacing of adjacent pairs of ribs 8,8 as shown in FIGS. 1 and 3 facilitates manufacture of the die part in that there is no need of accurate matching of the tips of adjacent ribs 8 and, moreover, accumulation of tolerance is avoided as compared with matching wherein the last set of ribs may end up in a space wider or narrower than the tip to tip dimension.

I, therefore, particularly point out and distinctly claim as my invention:

1. A bi-directional seal for a rotatable shaft, said seal including a member molded of resilient material which in its initially molded, unused and undeformed condition has an annular sealing lip of predetermined diameter, a pair of narrow elongated ribs on one side of said lip converging toward said lip, a generally cylindrical surface segment on said ribs at their convergence adjacent said lip and coaxial therewith and lying at approximately the same radius at least as large as that of said lip, said ribs extending angularly in opposite directions from said lip so as to provide a pumping action when said lip and said surface are in contact with said rotating shaft regardless of the direction of rotation of said shaft whereby fluid leaking past said sealing lip is pumped toward the other side of said lip by one or the other of said ribs.

2. A resilient shaft seal comprising an annular sealing surface, and a cylindrical surface on one side of said sealing surface having edges which define a circumferential series of wedge shaped pumping spaces with said sealing surface when said surfaces are in contact with a rotating shaft whereby fluid leaking past said sealing surface from the other side thereof is pumped back toward said other side of said sealing surface, said cylindrical surface being constituted by truncated portions of V-shaped ribs on said one side of said sealing surface.

3. The seal of claim 2 wherein said cylindrical surface is of diameter slightly greater than that of said sealing surface.

4. The seal of claim 2 wherein said ribs are arranged in pairs which converge toward said sealing surface.

5. The seal of claim 2 wherein said cylindrical surface is of diameter at least as large as that of said sealing surface.

6. The seal of claim 4 wherein the ends of each pair of ribs remote from said sealing surface are circumferentially spaced from corresponding ends of adjacent pairs of ribs.

7. A resilient shaft seal comprising an annular sealing surface, and adjacent wedge shaped pumping spaces constituted by a circumferential series of pairs of V-shaped ribs of which each pair converge axially and radially toward said sealing surface, the ends of each pair of ribs remote from said sealing surface being circumferentially spaced from corresponding ends of adjacent pairs of ribs.

* * * * *